United States Patent [19]

Caravaty

[11] Patent Number: 4,932,770

[45] Date of Patent: Jun. 12, 1990

[54] DUAL PLANE REAR VISION MIRROR

[76] Inventor: Raymond D. Caravaty, 534 West St., Pittsfield, Mass. 01201

[21] Appl. No.: 286,946

[22] Filed: Dec. 20, 1988

[51] Int. Cl.⁵ ........................... B60R 1/08; G02B 7/18
[52] U.S. Cl. .................................... 350/627; 350/606; 350/631; 248/467
[58] Field of Search ............... 350/627, 626, 612, 606, 350/631, 632; 248/467

[56] References Cited

U.S. PATENT DOCUMENTS

| | | |
|---|---|---|
| Re. 30,673 | 7/1981 | Feinbloom . |
| 2,493,546 | 1/1950 | Orser . |
| 2,663,224 | 12/1953 | Younglove . |
| 2,916,967 | 12/1959 | Husak . |
| 2,990,751 | 7/1961 | Miller . |
| 3,009,392 | 11/1961 | Snell . |
| 3,131,250 | 4/1964 | Ely . |
| 3,404,935 | 10/1968 | Creager . |
| 3,826,563 | 7/1974 | Davis . |
| 4,025,173 | 5/1977 | Schmaedeke . |
| 4,715,701 | 12/1987 | Urban . |

FOREIGN PATENT DOCUMENTS

| | | |
|---|---|---|
| 7243114 | 11/1972 | Fed. Rep. of Germany . |
| 2441088 | 3/1976 | Fed. Rep. of Germany . |
| 2701781 | 7/1978 | Fed. Rep. of Germany . |

Primary Examiner—Jon W. Henry
Attorney, Agent, or Firm—Fleit, Jacobson, Cohn, Price, Holman & Stern

[57] ABSTRACT

A pair of single plane mirror elements are mounted in relatively inclined positions relative to each other and from a wedge block including a rear mounting surface coplanar with the rear surface of one of the mirror elements, the rear surface of the other mirror element being mounted from the front side of the wedge block. Further, one margin of the first mirror element has a major portion of the length thereof seated in a rabbet formed in a marginal edge of the wedge block joining the wedge block rear surface.

7 Claims, 2 Drawing Sheets 4,932,770

DUAL PLANE REAR VISION MIRROR

BACKGROUND OF THE INVENTION

1. FIELD OF THE INVENTION

This invention relates to a dual plane mirror assembly of the type to be used as an outside rear vision mirror on the driver's side of a vehicle and wherein two plane mirror elements are supported in fixed relatively angulated positions relative to each other. The two mirror elements are mounted relative to each other by a wedge block over whose front surface one plane mirror element is mounted and including a rear surface coplanar with the back surface of the second plane mirror element, the wedge block including a rabbet in which the marginal edge of the second plane mirror element is secured and the coplanar surfaces of the wedge block and second plane mirror element being easily mountable over an existing plane mirror or planar surface defining structure of a mirror mounting structure.

2. DESCRIPTION OF RELATED ART

Various different forms of dual plane mirrors heretofore have been provided such as those disclosed in U.S. Pat. Nos. 2,493,546, 2,663,224, 2,916,967, 2,990,751, 3,009,392, 3,131,250, 2,663 224, 3,404,935, 3,826,563, 4,025,173, 4,182,552 and 4,715,710 as well as U.S. Re. Pat. No. 30,673 and German Pat. Nos. 23 316 333, 24 41 088 and 27 01 781. However, these previously known forms of dual plane mirrors do not include the overall combination of structural features included in the instant invention.

SUMMARY OF THE INVENTION

The dual plane mirror of the instant invention has been specifically designed to comprise an accessory mirror readily securable over an existing single plane rear vision mirror, as a replacement mirror for a broken single plane mirror mounted upon planar mounting surface means or as an original equipment mirror readily substituted for a single plane mirror mounted upon planar mounting surface means.

In order to provide a dual plane mirror assembly which may be readily mounted upon any suitable planar mounting surface means, the back surface of the dual plane mirror must itself be substantially planar. However, inasmuch as dual plane mirrors involve two relatively inclined mirrors, difficulty is encountered in providing a dual plane mirror assembly which is thin as possible, inexpensive to produce and of relatively lightweight construction.

The main object of this invention is to provide a dual plane mirror assembly having a rear face which is substantially planar and which therefore may be readily mounted from planar mounting surface means.

Another object of this invention is to provide a dual plane mirror assembly which utilizes two separate plane mirror elements and provides an inexpensive manner of relatively stationarily mounting the mirror elements.

Yet another object of this invention is to provide a dual plane mirror which will be of lightweight construction.

A further important object of this invention is to provide a dual plane mirror of minimum thickness.

A further object of this invention is to provide a dual plane mirror that may be readily varied in size during manufacture.

A final object of this invention to be specifically enumerated herein is to provide a dual plane mirror in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
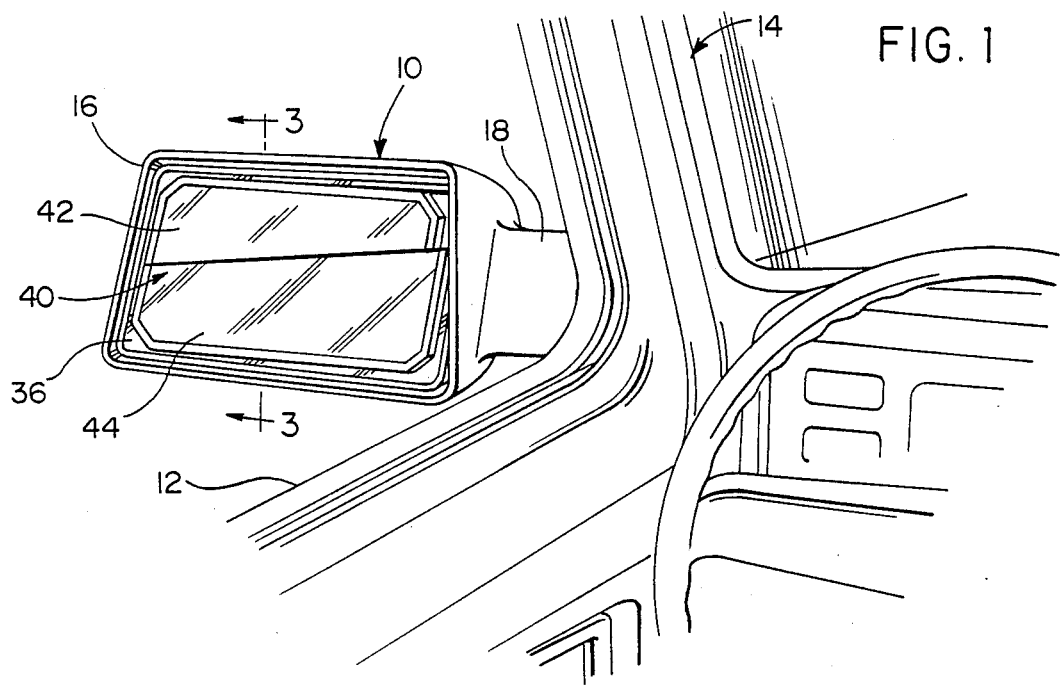
FIG. 1 is a fragmentary perspective view of an outside driver's side rear vision mirror as seen from the driver's position interiorly of the associated vehicle and with the rear vision mirror incorporating an after market accessory dual plane mirror constructed in accordance with the resent invention mounted directly from the original equipment single plane mirror.

Referring now more specifically to the drawings, the numeral 10 generally designates a conventional automotive outside rear vision mirror assembly mounted upon the exterior surface of the left side front door 12 of a passenger vehicle referred to in general by the reference numeral 14.

Figure 2:
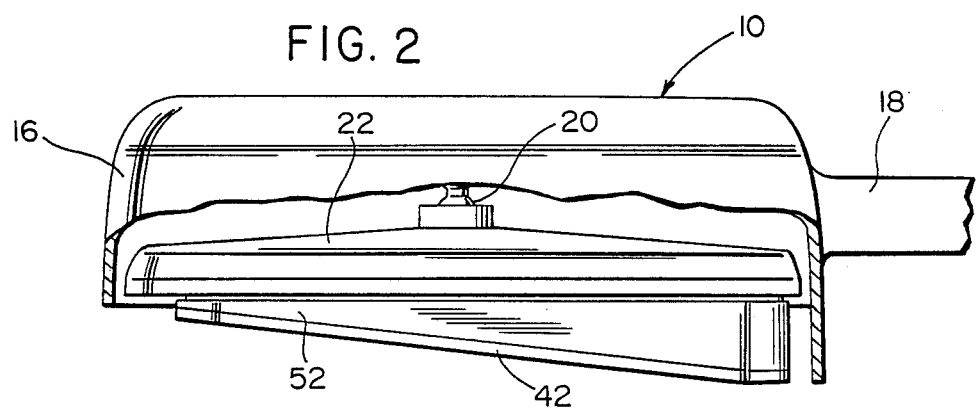
FIG. 2 is an enlarged top plan view of the rear vision mirror illustrated in FIG. 1 with upper portions of the mirror housing being broken away and illustrated in horizontal sections.
Figure 3:
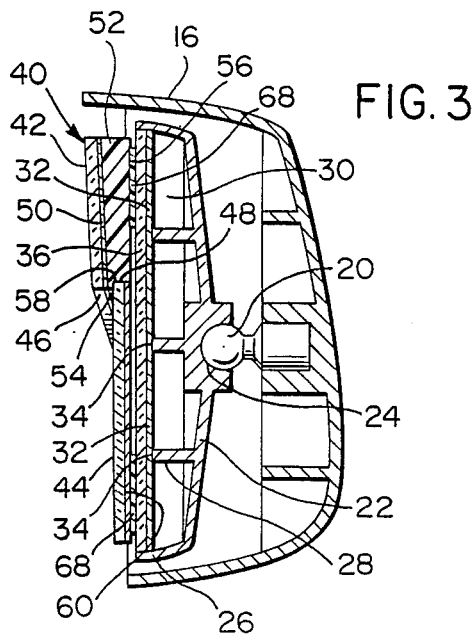
FIG. 3 is an enlarged vertical sectional view taken substantially upon the plane indicated by the section line 3—3 of FIG. 1.

Conventionally, as may be seen in FIGS. 2 and 3, the mirror assembly 10 includes a rearwardly opening housing 16 attached to the vehicle door 12 through the utilization of an integral laterally outwardly projecting mount 18. Conventionally, the interior of the housing 10 includes a mounting ball portion 20 from which a mirror mount 22 is supported for universal angular adjustment relative to the housing 16 through the utilization of a partial spherical socket 24 in which the ball 22 is captively received. The mirror mount 24 usually is constructed of plastic and includes a peripheral wall 26 inwardly of which crossed vertical and horizontal mounting ribs 28 and 30 are formed, the ribs 28 and 30 including coplanar mounting surfaces 32 and 34 over which the coated non-reflective back side of a plane mirror element 36 is mounted within the peripheral wall 26.

The foregoing comprises a description of a conventional rear vision mirror assembly. The mirror assembly 10 is of the type which may be manually adjusted at the plane mirror element 36. However, other rear vision mirror assemblies similar to the rear vision mirror assembly are known wherein electrically and manually operated cables allow adjustment of a mirror element such as the mirror element 36 from interiorly of an associated vehicle corresponding to the vehicle 14. However, in most instances, substantially all original equipment planar mirror elements corresponding to the mirror element 36 are mounted from coplanar surfaces corresponding to the coplanar mounting surfaces 32 and 34.

The dual plane mirror assembly of the instant invention is referred to in general by the reference numeral 40 and includes first and second plane mirror elements 42 and 44. The mirror elements 42 and 44 include substantially registering first and second margins 46 and 48, respectively, and the first mirror element 42 is mounted upon the front surface 50 of an elongated wedge block 52. The wedge block 52 includes a marginal edge 54 which substantially coincides with and extends along the first margin 46 and the marginal edge 54, along the rear side 56 of the wedge block 52, includes a rabbet 58 in which the second margin 48 of the mirror element 44 is seated, the rear side 56 of the wedge block and the rear side 60 of the second mirror element 44 being coplanar.

Figure 5:
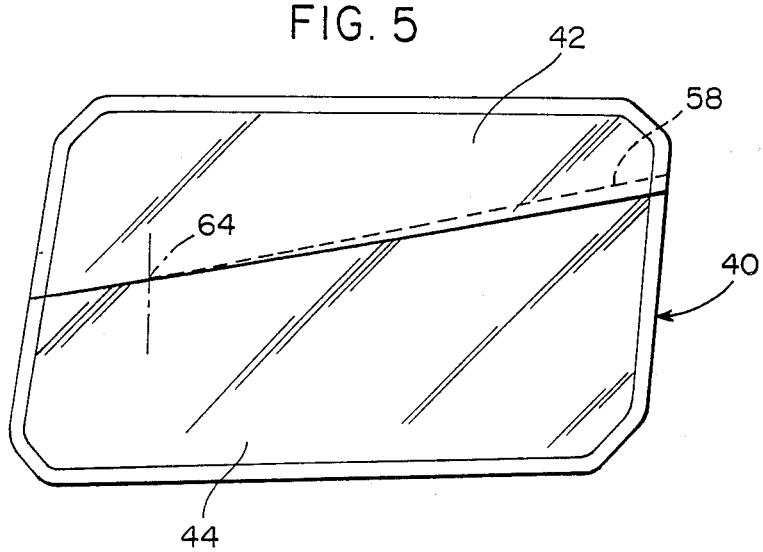
FIG. 5 is an elevational view of the dual plane mirror as seen from the reflective side thereof.
Figure 6:
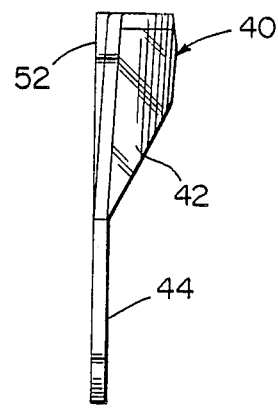
FIG. 6 is an end elevational view of the assemblage illustrated in FIG. 5 as seen from the left side of FIG. 5.
Figure 7:
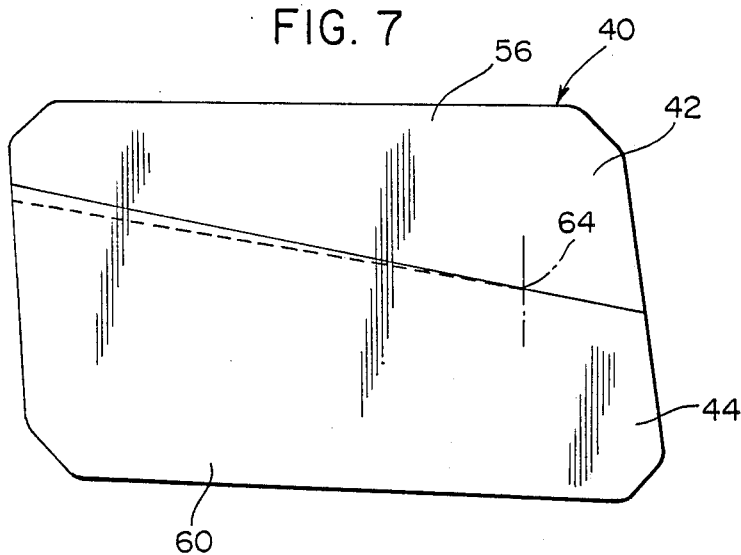
FIG. 7 is an elevational view of the rear nonreflective side of the dual plane mirror illustrated in FIG. 5.
Figure 8:
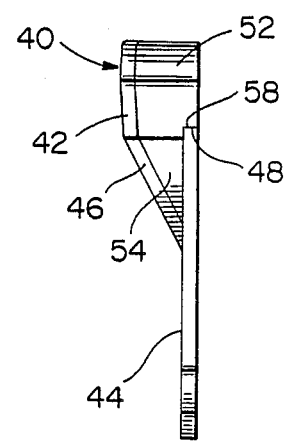
FIG. 8 is an end elevational view of the assemblage illustrated in FIG. 5 as seen from the right side thereof.
Figure 9:
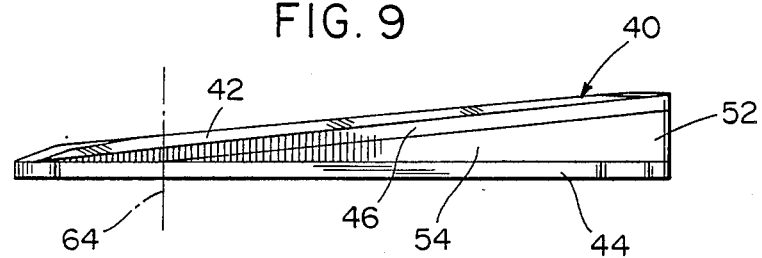
FIG. 9 is a bottom plan view of the assemblage illustrated in FIG. 5.

As may be seen from FIGS. 5 and 7 of the drawings, the rabbet 58 extends along the wedge block 52 from the inner end thereof to a point 64 spaced inwardly of the outer end of the wedge block 52. Thus, the rabbet 58 tapers in depth, measured in the plane containing the mirror element 44, from the right end of the wedge block 52 toward the left end of the wedge block 52. In addition, the depth of the rabbet 58 as measured along a line normal to the mirror element 44, remains constant from the inner end of the wedge block 52 to the point 64. Inasmuch as the first margin 48 of the mirror element 44 is seated in the rabbet 58, from the point 64 to the outer or left end of the wedge block 52 the first margins 46 and 48 are disposed in at least partial opposing registry with each other.

The front surface 50 of the wedge block 52 tapers toward the rear surface 56 from the inner end of the wedge block 52 toward the outer end thereof and also tapers toward the rear surface 56 of the wedge block 52 from the upper edge of the wedge block 52 toward the marginal edge 54 thereof. In this manner, assuming that the second mirror element 44 is adjusted in the same manner in which a single plane mirror element would be adjusted, the first mirror element 42 affords the driver of the vehicle 14 a more downward and outward inclined rearward view than that afforded by the second mirror element 44.

The dual plane mirror assembly 40 is mounted upon the original equipment plane mirror element 36 merely through the utilization of suitable adhesive 68. Accordingly, the dual plane mirror assembly 40 may be added to any existing plane mirror element such as that indicated at 36 in a minimum of time and with a minimum of effort. Further, the thinness of the assembly 40 does not cause the assembly 40 to project excessively from the open side of the housing 16.

Figure 4:
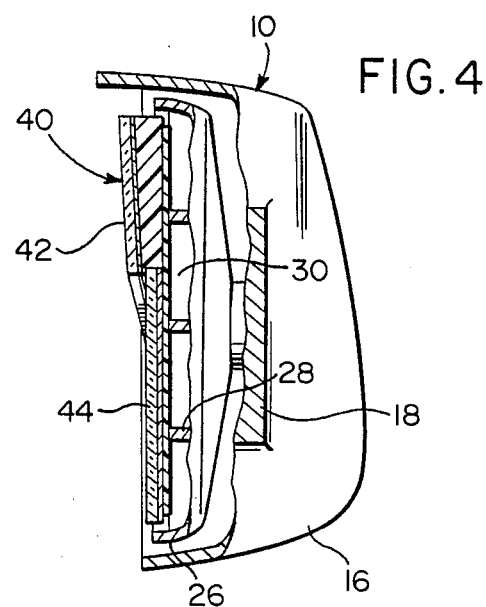
FIG. 4 is a vertical sectional view similar to FIG. 3, but illustrating the dual plane mirror as mounted upon the rear vision mirror planar mounting surface means of the rear vision mirror in lieu of the original equipment single plane mirror.

However, the original plane mirror element 36 may be broken and, in such instance, all pieces of the plane mirror element 36 may be removed from the coplanar surfaces 32 and 34 and the dual plane mirror assembly 40 may be mounted directly to the mirror mount or member 22 in lieu of the broken mirror element, see FIG. 4. Also, it will of course be apparent that the dual plane mirror assembly 40 may be used as an original equipment item and be mounted directly from the mirror mount 22 instead of the plane mirror element 36 at the time the rear vision mirror assembly 10 is manufactured.

One important aspect of the mirror assembly 40 is that its front-to-rear thickness is maintained as thin as possible. Further, the wedge block 52 need not be of solid construction, but it may include intermediate portions thereof constructed in somewhat the same manner in which the mounting member 22 is constructed to conserve on cost of materials and weight. Still further, the dual plane mirror assembly 40 is constructed utilizing only relatively inexpensive plane mirror elements 42 and 44 and, accordingly, only the sizes and shape of the mirror elements 42 and 44 as well as the wedge block 52 need be altered so specifically adapt the dual plane mirror assembly 40 for use in conjunction with various size and shapes of rear vision mirror assembly housings corresponding to the housing 16.

The use of the rabbet 58 provides a more secure joining of the mirror element 44 to the wedge block 52 and thus a more secure mounting of the mirror elements 42 and 44 in predetermined relatively angularly displaced positions.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A dual plane mirror assembly including a first mirror element and a second mirror element, each of said elements including a reflective front side and a rear side, said first and second mirror elements including first and second substantially straight margins, respectively, elongated wedge block means including a substantially straight marginal edge of a length at least generally equal in length to one of said margins and extending between front and back surfaces of said wedge block means, the other of said margins being at least generally the same length as said marginal edge, said first mirror element being mounted to said wedge block means with the rear side of said first mirror element overlying and opposing said front surface and said first margin extending along and substantially coinciding with said marginal edge, said marginal edge, along said back surface, including a rabbet extending therealong of a constant depth, measured at right angles relative to said back surface, substantially equal to the thickness of said second mirror element along said second margin, said rabbet extending from one end of said marginal edge toward the other end thereof and tapering in transverse width, measured in the plane of said back surface, toward said other end of said marginal edge, the transverse width tapering of said rabbet being such that said rabbet terminates and intersects with said marginal edge at a point spaced slightly from said other end of said marginal edge, said front surface being inclined, longitudinally of said wedge block means, toward said back surface, said second mirror element being arranged with a major portion of said second margin seated in said rabbet and the rear side of said second mirror element at least substantially coplanar with said back surface and the remaining portion of said second margin closely opposing the corresponding portion of said first margin.

2. The mirror assembly of claim 1 wherein said front surface is inclined, transversely of said wedge block means, toward said rear surface.

3. The mirror assembly of claim 1 including a vehicle outside mirror assembly for mounting upon a vehicle exterior, said outside mirror assembly including a housing having one open side, a mirror mount mounted in said housing and including means defining planar surface means facing outwardly of said one open side, said dual plane mirror assembly being mounted from said planar surface means with said rear side and back surface mounted from and opposing said planar surface means.

4. The mirror assembly of claim 3 wherein said planar surface means is defined by a planar mirror element mounted from said mirror mount.

5. The mirror assembly of claim 3 wherein said planar surface means is defined by said mirror mount.

6. The mirror assembly of claim 5 wherein said front surface is inclined, transversely of said wedge block means, toward said rear surface.

7. The mirror assembly of claim 6 wherein said front surface is inclined, transversely of said wedge block means, toward said rear surface.

* * * * *